(12) United States Patent
Miklös et al.

(10) Patent No.: US 11,202,252 B2
(45) Date of Patent: Dec. 14, 2021

(54) INCLUSION OF A MESSAGE PROXY IN A SERVICE BASED ARCHITECTURE

(71) Applicant: Telefonaktiebolaget LM Ericsson (publ), Stockholm (SE)

(72) Inventors: György Miklös, Pilisborosjenö (HU); Attila Mihály, Dunakeszi (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/965,552

(22) PCT Filed: Feb. 6, 2018

(86) PCT No.: PCT/EP2018/052930
§ 371 (c)(1),
(2) Date: Jul. 28, 2020

(87) PCT Pub. No.: WO2019/154476
PCT Pub. Date: Aug. 15, 2019

(65) Prior Publication Data
US 2021/0051573 A1    Feb. 18, 2021

(51) Int. Cl.
*H04W 8/00*    (2009.01)
*H04W 48/16*    (2009.01)
(Continued)

(52) U.S. Cl.
CPC ............. *H04W 48/16* (2013.01); *H04L 67/16* (2013.01); *H04W 88/182* (2013.01)

(58) Field of Classification Search
CPC .. H04W 12/06; H04W 48/16; H04L 63/0884; H04L 67/16
See application file for complete search history.

(56) References Cited

U.S. PATENT DOCUMENTS

| | | | | |
|---|---|---|---|---|
| 9,693,217 | B2 * | 6/2017 | Kasslin | ............... H04L 67/16 |
| 2013/0281056 | A1 * | 10/2013 | Abraham | ............. H04W 48/16 |
| | | | | 455/411 |

(Continued)

OTHER PUBLICATIONS

International Search Report and Written Opinion dated Nov. 9, 2018 for International Application No. PCT/EP2018/052930 filed on Feb. 6, 2018, consisting of 13-pages.

(Continued)

*Primary Examiner* — Michael T Vu
(74) *Attorney, Agent, or Firm* — Christopher & Weisberg, P.A.

(57) ABSTRACT

A method for handling a service discovery request for a service provided by a service based architecture communications network. The service discovery request is received from a client, the received service discovery request has a plurality of service related parameters. A service identifier is assigned to the service discovery request, the identifier linking the received service discovery request to the plurality of service related parameters. The plurality of service related parameters are stored. A service discovery response is transmitted to the client in response to the received service discovery request. A subsequent request related to the service is received. The plurality of service related parameters for the subsequent request based on the received service identifier present in the subsequent request and the stored plurality of service related parameters is determined. A list of processing entities capable of handling the subsequent request related to the service is determined.

20 Claims, 7 Drawing Sheets

(51) Int. Cl.
*H04L 29/08* (2006.01)
*H04W 88/18* (2009.01)

(56) References Cited

U.S. PATENT DOCUMENTS

2017/0237818 A1* 8/2017 Fang .................. H04W 4/00
709/227
2017/0303259 A1 10/2017 Lee et al.

OTHER PUBLICATIONS

Samsung; NF Service Discovery Corrections—TS 23.501; 3GPP Draft; S2-181269 S2-181135 S2-180243 23501_NF Service Discovery; Jan. 25, 2018, pp. 1-16; vol. SA WG2; 3rd Generation Partnership Project 3GPP Mobile Competence Centre, XP051382650; Gothenburg, Sweden, consisting of 12-pages.
NGMN Alliance; Service-Based Architecture in 5G; 3GPP DRAFT; 180119 NGMN Service Based Architecture in 5G VI .0, 3rd Generation Partnership Project 3GPP Mobile Competence Centre Jan. 22, 2018, XP051382470; Sophia-Antipolis Cedex, France, consisting of 18-pages.

* cited by examiner

INCLUSION OF A MESSAGE PROXY IN A SERVICE BASED ARCHITECTURE

CROSS-REFERENCE TO RELATED APPLICATIONS

This application is a Submission Under 35 U.S.C. § 371 for U.S. National Stage Patent Application of International Application Number: PCT/EP2018/052930, filed Feb. 6, 2018 entitled "INCLUSION OF A MESSAGE PROXY IN A SERVICE BASED ARCHITECTURE," the entirety of which is incorporated herein by reference.

TECHNICAL FIELD

The present application relates to a method for handling a service discovery request for a service provided by a service based architecture communications network and relates to the corresponding entity handling the service discovery request. Furthermore, a computer program comprising program code and a carrier comprising the computer program is provided.

BACKGROUND

Wireless systems and mobile networks of the 5th generation, abbreviated 5G, are the telecommunications standards succeeding the current 4th Generation, 4G/International Mobile Telecommunications-Advanced, IMT-Advanced, standards.

One of the goals of 5G is that the data traffic handling capacity thereof, compared to traditional 4G networks, is improved such that a higher density of User Equipment, UE, in a particular area can be obtained. Further, 5G research and development aim at lower latency than 4G equipment and lower battery consumption, for better implementation of, for example, Internet of Things, IoT, applications.

Compared to 4G networks, for example, traditional peer-to-peer interfaces and protocols are modified in 5G by a so-called Service Based Architecture, SBA, wherein Network Functions, NFs, provide support to one or multiple service consumers by means of an HTTP-based communication protocol. In other words, the different NFs may implement one or more services, which are self-contained functionalities that can be changed and modified in an isolated manner.

System procedures, such as, but not limited to, an attach procedure, a service request procedure, and a handover procedure, involve services within different NFs, and comprise a sequence of messages between these services, invoking service operations.

Accordingly, services communicate with other services using messages. Two main types of messages may be distinguished, the synchronous (Request-Response) and asynchronous (Publish-Subscribe) message. To find the service to communicate with there may be a need for a service discovery process. Service discovery is particularly useful for dynamic configuration, especially in a cloud environment, where a service may have a set of instances, and the number of instances or processing entities of a service could change dynamically because of failures or depending on load to provide dynamic scaling. Therefore, the service discovery should also provide or be complemented with a mechanism for handling fail-over of service instances, i.e. the processing entities providing the service and load balancing across multiple instances of a service.

An example service request involving a discovery process is shown in FIG. 1. This mechanism resembles the one also proposed in 3GPP SA2. A client 10 represents the service issuing the request, while the servers are different instances of a given service the client wants to communicate with. It is a client-side discovery, i.e., the client is responsible for determining the network locations of available service instances and load balancing requests across them. In Step S11, the client queries a service registry 20, which is a database of available service instances 31, 32. In the 3GPP proposal, this is the Network Repository Function (NRF). Each service instance 31, 32 is responsible for registering and deregistering itself with the service registry 20. The client 10 may have continuous load and health information from the different service instances (dashed lines). The client 10 then uses a load-balancing algorithm to select one of the available service instances 31, 32 based on this information, and makes a request (Step S12).

There are a number of functions that need to be realized in combination with service communication, and the state of the art architecture requires the implementation of these functions separately for each service. Such common functions include Service discovery, including optional service features that are embedded in the client request and should be selected based on a negotiation process with the servers. Each client should then keep the received information in its local cache for further use.

Access control, which is implemented in the registry 20, and performed during service discovery. One deficiency of the existing method is that access control for a certain service refers to the whole client, which may be, in some cases, insufficient.

Load balancing among different instances 31, 32 of the same service, which is assumed to be implemented in the client. Load balancing also involves learning about health and load information of different service instances, which is complex, and in some cases may raise trust issues.

Message reliability handling, implemented in the clients, including
Message retransmissions
Failure handling. i.e., retransmit to other instances after failure reliability handling Security, e.g., message authentication and encryption It would be helpful to include a Message Proxy (MP) in a system that assumes client based service selection.

The problem with the an inclusion of a message proxy is that important information sent by the client in the service discovery message may be lost. In general, there could be several parameters sent by the client in the service discovery process based on which the service could be selected: type, version, connectivity, communication protocols, other capabilities, e.g. response time etc. One client may use different parameter values or only a subset of these parameters for a certain request.

Accordingly, a need exists to provide a solution to select the right service instance in an environment when a message proxy is involved in the procedure.

SUMMARY

This need is met by the features of the independent claims. Further aspects are described by the dependent claims.

According to a first aspect a method for handling a service discovery request for a service provided by a service based architecture communications network is provided. The entity handling the service discovery request is involved in the following steps: it receives the service discovery request from a client requesting a service in the service based architecture communications network in which the service is provided by a plurality of different processing entities, wherein the received service discovery request comprises a plurality of service related parameters. Furthermore, a service identifier is assigned to the service discovery request, wherein the service identifier links the received service discovery request to the plurality of service related parameters. The plurality of service related parameters are stored with the service identifier at the entity handling the service discovery request. Furthermore, a service discovery response is transmitted to the client in response to the received service discovery request. This service discovery response comprises the service identifier. The entity furthermore receives a further service request related to the service and this further service request comprises the service identifier. The plurality of service related parameters for the service request are determined based on the received service identifier present in the further service request and the stored plurality of service related parameters. Furthermore, a list of processing entities capable of handling the subsequent request related to the service is determined based on the determined plurality of service related parameters.

By assigning a service identifier to the service discovery request which provides a link between the service discovery request and the plurality of service related parameters, it is possible to convey information related to the parameters used in the service discovery request from the client to the subsequent requests. The service identifier is a kind of unique ID which is also present in the subsequent request related to the service that is requested in this service discovery request.

Furthermore, the corresponding entity is provided handling the service discovery request wherein the entity comprises a memory and at least one processing unit and wherein the memory comprises instructions executable by the at least one processing unit. The entity is then operative to carry out the method discussed above or discussed in further detail below.

As an alternative, an entity is provided configured to handle a service discovery request for a service provided by a service based architecture communications network, wherein the entity comprises a first module configured to receive the service discovery request from the client requesting a service in the service based architecture communications network in which the service provided by a plurality of different processing entities. The received service discovery request comprises a plurality of service related parameters. The entity comprises a second module configured to assign the service identifier to the service discovery request wherein the service identifier links the received service discovery request to the plurality of service related parameters. A third module is configured to store the plurality of service related parameters with the service identifier at the entity handling the service discovery process. A fourth module of the entity is configured to transmit a service discovery response to the client in response to the received request wherein this response comprises the service identifier. A fifth module of the entity is configured to receive a subsequent request related to the service wherein this received subsequent request comprises the service identifier. A sixth module of the entity is configured to determine the plurality of service related parameters for the subsequent request based on the received service identifier present in the subsequent request. A seventh module of the entity is then configured to determine a list of processing entities capable of handling the subsequent request related to the service based on the determined service related parameters.

The service related parameters received with the service discovery request can comprise one of the following parameters: a type of the requested service, a version of the requested service a connectivity parameter indicating where the service is accessible such as locally on the same rack, in the same datacenter or remotely, information about the communication protocols, other capabilities of the requested service, a response time.

Furthermore, a computer program comprising a program code is provided to be executed by at least one processing unit of an entity handling a service discovery request. Execution of the program code causes the at least one processing unit to execute a method as mentioned above or as discussed further detail below.

Furthermore, a carrier comprising the computer program is provided wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
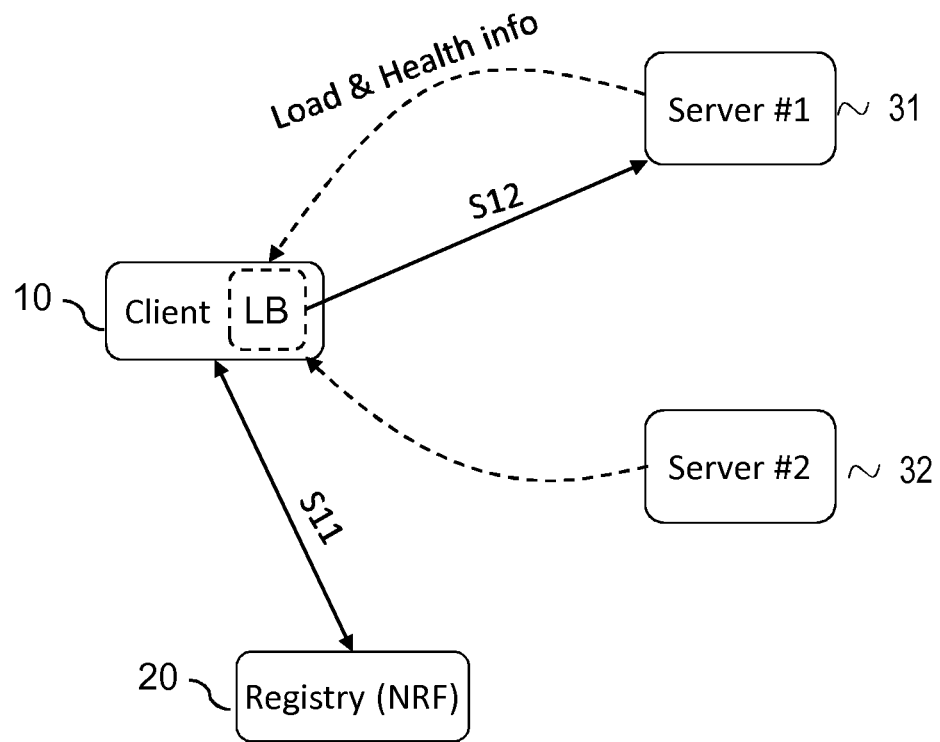
FIG. 1 shows a schematic representation of an architecture known in the art for a service discovery request.

In the following, embodiments of the invention will be described in detail with reference to the accompanying drawings. It is to be understood that the following description of embodiments is not to be taking a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general-purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

In the following a solution is proposed to convey information related to service related parameters used in a service discovery request from a client in the subsequent client requests the service discovery request was issued for. As discussed in further detail below, when the service discovery request is received, the service discovery input, the information contained in the service discovery request is stored and a unique ID, the service identifier is assigned to it. The service identifier is then encoded in the service discovery result in a way that it becomes part of the subsequent requests to the service that was previously searched for in the service discovery request.

A first embodiment is discussed in connection with FIG. 2 in which it is assumed that a default, registry based service discovery is used which means that the service discovery request by the client 50 in step S21 goes to a registry 200 wherein the registry is a database containing the available service instances, here the processing entities or servers 31 and 32. The service discovery request is accompanied by several service related parameters such as the type of the requested service, the version of the requested service, information about connectivity, a communication protocol etc. The registry 200 stores the parameters of the service discovery request as symbolised by the database in which the ID, the service identifier is stored. Accordingly, the registry assigns an ID to it, the service identifier. The service discovery reply of step S22 then encodes and includes this ID and furthermore includes a pointer to a message proxy 100. Accordingly, the client 50 can include the service identifier in the message sent in step S23 to the message proxy. The same ID can be used in the subsequent service discovery carried out between the message proxy 100 and the registry 200 to identify this selection criteria sent by the client to the registry 200. The registry then informs the message proxy of the list of service or processing entities that can provide the requested service, the list comprising only the servers that meet the requirements indicated by the parameters. The proxy 100 can then select a corresponding processing entity from the list taking into account related service parameters. In step S25 the message proxy then can send a request for the service to the corresponding server in step S25.

Figure 2:
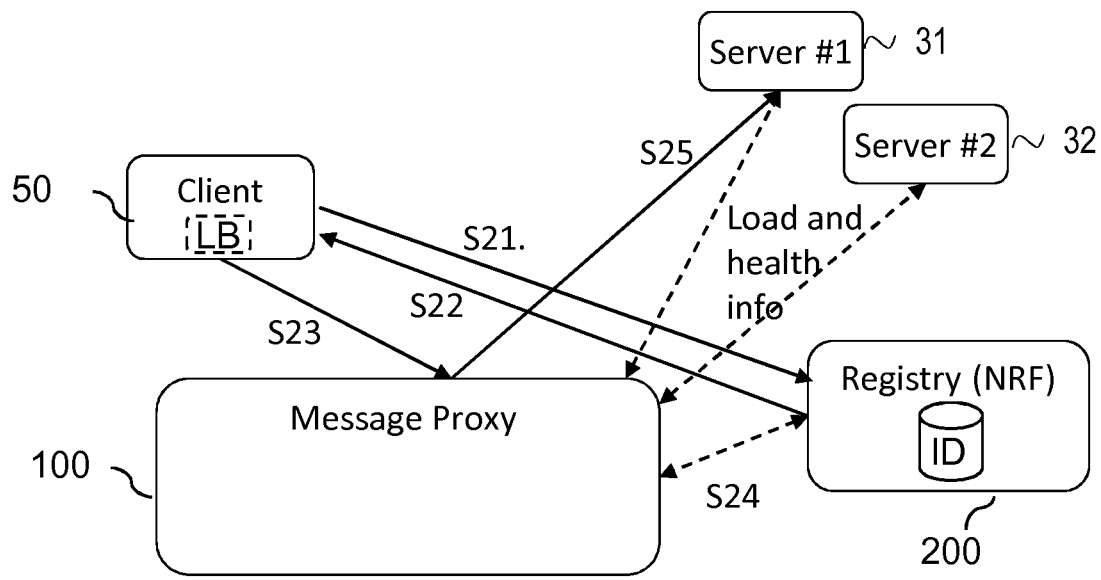
FIG. 2 shows a schematic representation of an architecture including a message proxy and the involved message exchange in which a service identifier helps to convey information from a service discovery request to other requests related to the service.
Figure 3:
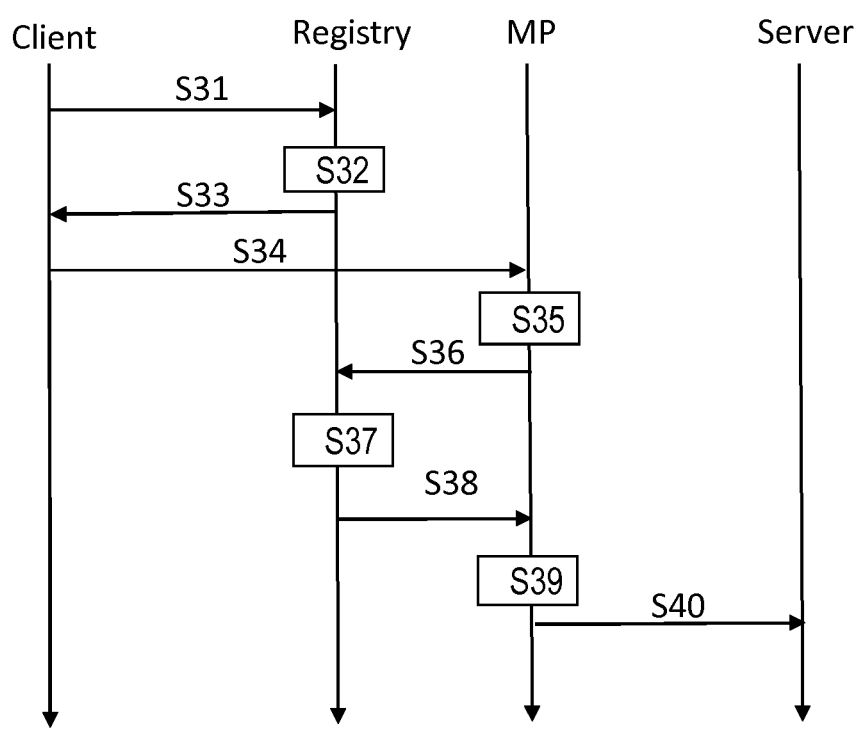
FIG. 3 shows a more detailed message exchange between the entities involved for the embodiment of FIG. 2.

A more detailed explanation of the message exchange of FIG. 2 is given in FIG. 3.

In step S31 the service discovery request is sent from the client 50 to the registry in step S31 wherein this service discovery request comprises the service parameters relating to the service in question.

In step S32 the registry creates the new service identifier and stores it together with the parameters of the client request received in step S31. Similar to step S22 the service discovery response is communicated back to the client in step S33, this response including the service identifier and information how the message proxy can be reached.

In step S34 the client then transmits the service request intended to the server to the message proxy 100. This request contains the service identifier. The proxy extracts in step S35 the identifier and stores it, and in step S36 a service discovery request including the said identifier is sent to the registry. In step S37 the registry generates a list of processing entities capable of carrying out the requested service or capable of handling subsequent requests related to the requested service based on the determined ID and the information which processing entity is capable of carrying out the requested service based on the parameters contained in the service identifier. In step S39 the message proxy then selects a server which should carry out the requested service and sends the request of step S34 to the selected server in step S40 with the only difference of the proxy source IP address, so that the reply by the server will also reach the proxy, which in turn will transmit the reply to the client.

Figure 4:
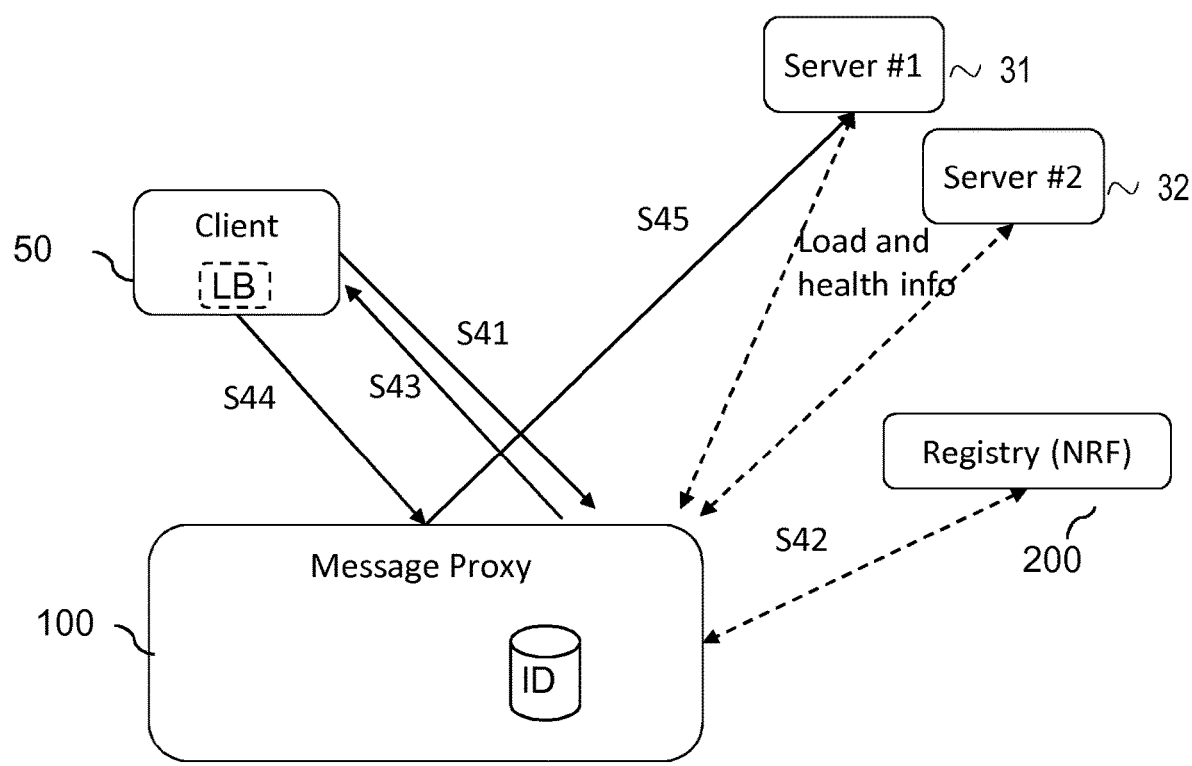
FIG. 4 shows a schematic further message flow between the involved entities similar to FIG. 2 in which a message proxy itself handles the service discovery request.

FIG. 4 shows another embodiment how a message proxy is included in the service discovery request. Here it is assumed that the service discovery message by the client is also mediated by the message proxy 100, by way of example via client configuration or DNS (Domain Name System) discovery. Accordingly, in step S41 the service discovery request is directly sent to the message proxy 100 wherein the proxy stores the service related parameters contained in the service discovery request. The message proxy 100 assigns the service identifier and stores it as symbolised by the ID shown in the message proxy 100 of FIG. 4. In step S42 the service discovery message is forwarded to the registry 200 and the server list in the reply is also stored in the record identified by the service identifier. The message proxy then prepares its own service discovery reply identifying itself as the service requesting to carry out the service and similarly, as in the embodiment of FIGS. 2 and 3, it encodes the service identifier in the reply sent in step S43. Accordingly, in the subsequent request or requests from the client in step S44 the service identifier is included and will go to the message proxy wherein the request relates to the intended service. Based on the service identifier the message proxy can identify the list of servers received from the registry in the communication in step S42. The message proxy can send the request in step S45 to one of the processing entities 31 or 32 based on several criterions, such as a load balancing logic, latency and/or direct server feedback.

Figure 5:
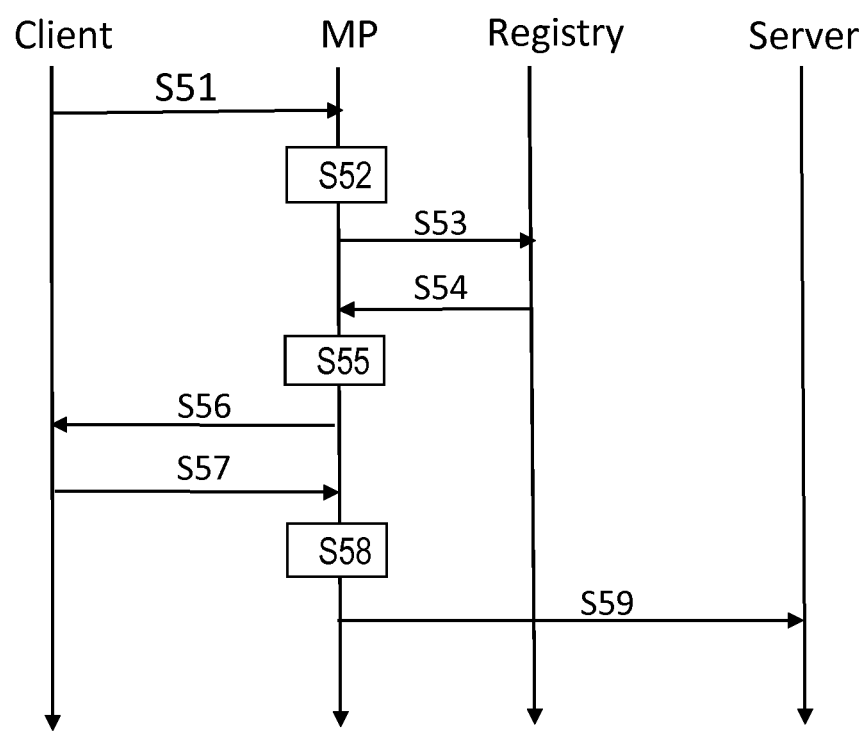
FIG. 5 shows a more detailed view of a message exchange in the situation of FIG. 4.

FIG. 5 shows a more detailed message flow between the entities for the embodiment described in FIG. 4. In step S51 the service discovery request is sent by the client to the message proxy 100, the service discovery request including the service related parameters. In step S52 the message proxy stores the parameters and creates the service identifier with which the identifier is linked to the service parameters received with the request. A second service discovery request is sent to the registry wherein this request in step S53 also comprises the parameters as received in step S51. The registry then returns a service discovery reply in step S54 including a server list of servers or processing entities that are available or carrying out the requested service for which the service discovery request was received. In step S55 the message proxy carries out a mapping of the ID to the list of servers. Accordingly, the server list is stored in a record or dataset to which the service identifier and the store parameters belong. In step S56 the reply message to the service discovery request of step S51 is sent to the client including the service identifier and including the reachability of the message proxy. The reachability may be included as the message proxy may provide different services reachable via different IP addresses, so that the IP address of the current service may be included. In step S57 the client sends a subsequent request belonging to the requested service wherein this request comprises the service identifier. In step S58 the message proxy extracts the service identifier and determines the list of servers related to the service identifier. The message proxy then selects a server from the list of servers and transmits in step S59 the request to the server.

In the embodiments discussed in FIGS. 3 and 5 a subsequent request is sent either to the registry by the message proxy in step S36 or is sent by the client. In the embodiment of FIG. 5 in step S57 the subsequent requests include the service identifier. There are different options how to encode the service identifier into the request.

One option would be to encode the ID in an FQDN (fully qualified domain name) from the registry.

For example, the FQDN could take the form: ID_Z.MP_X.mydomain.com, where all the different FQDNs terminating in MP_X.mydomain.com are resolved in the same MP_X IP address. The Host header in the Client request then contains the FQDN and enables the MP to extract the ID needed for service discovery (Step S35 in FIG. 3). Instead of storing the ID, an option is that the MP sets a cookie in the response to the Client that contains the parameters used in service discovery, with a properly set domain attribute (e.g., set to ID_Z.MP_X.mydomain.com); this cookie will be then sent for each subsequent request that is issued to the given domain.

Another alternative is to encode the ID in an IPv6 address from the register 200. For example, it may be encoded in the last significant bits of the 64-bit interface identifier, where the most significant bits define the MP's interface IP address. Another option is to ensure that the IPv6 prefix identifies the MP, and all possible addresses resulting from the combination of the above prefix and the ID identify logical IPv6 addresses for this MP.

The combination of the above two alternatives is also possible, i.e., the ID is encoded in an FQDN from the Registry, and then the DNS resolution of this FQDN results in an IPv6 address that points to the MP but also encodes the ID.

Figure 6:
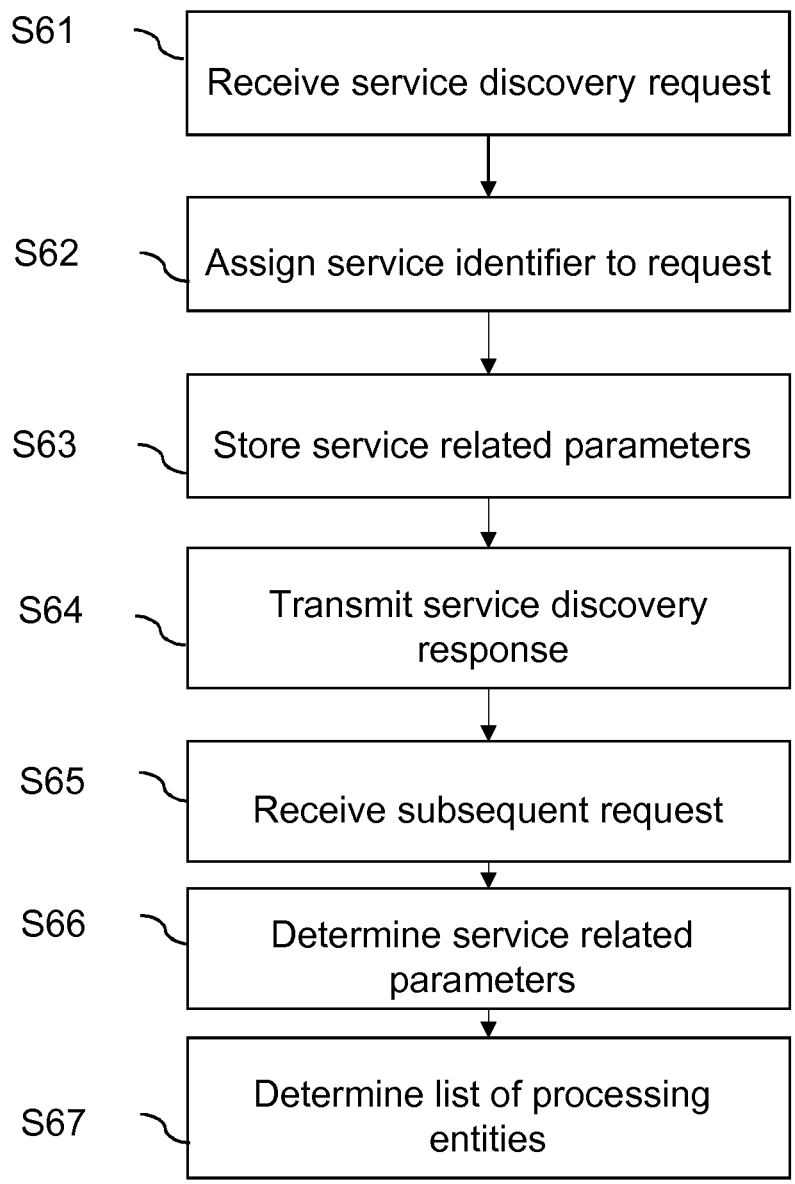
FIG. 6 shows an example schematic representation of a flow diagram including the steps carried out by the entity handling the service discovery request.

FIG. 6 summarises some of the relevant steps carried out either by the registry 200 in the embodiment of FIG. 2 or by the message proxy 100 in the embodiment of FIG. 4. In both embodiments the corresponding entity, either the message proxy 100 order the registry 200 receives the service discovery request from the client as shown by step S31 or step S51 wherein the service discovery request comprises a plurality of service related parameters. In step S62 the corresponding entity then assigns a service identifier to the service discovery request which links the identifier to the plurality of service related parameters as discussed above in connection with step S32 and step S52. Furthermore, the identifier is stored in step S63 with the plurality of service related parameters in the message proxy in the embodiment of FIG. 4 and in the registry in the embodiment of FIG. 2. In step S64 a service discovery response is transmitted to the client wherein the service discovery response comprises the service identifier. This step was discussed above in step S33 or S56.

Furthermore in step S65 the entity receives a subsequent request related to the service for which the service discovery request was received in step S61. This subsequent service request comprises the service identifier. Based on the received service identifier the corresponding entity can determine in step S66 the service related parameters that belong to the service discovery request. In step S67 the entity can then determine a list of processing entities that are capable of handling the subsequent request related to the service taking into account the service related parameters stored for the service discovery request. This step was discussed above in more detail in step S37 or S58.

Figure 7:
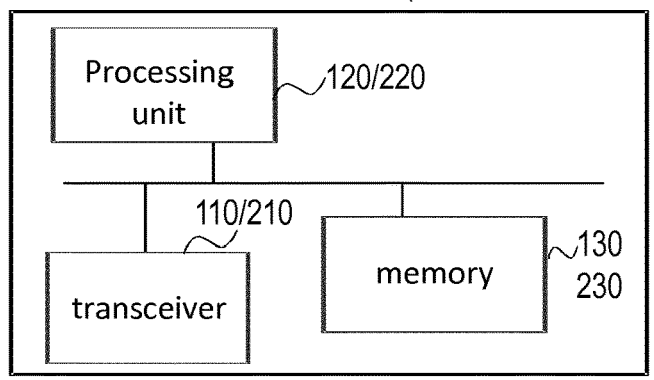
FIG. 7 shows an example schematic presentation of the entity handling the service discovery request.

FIG. 7 shows a schematic architectural view of the entity that is handling the service discovery request. In the embodiment shown in FIG. 7 it is the message proxy, accordingly, it corresponds to the embodiment described FIGS. 4 and 5. However, the entity shown can also be the registry 200 as symbolised by the reference numerals indicated in brackets and is discussed in FIGS. 2 and 3. The entity, thus either the message proxy 100 of the registry 200 comprises an interface 110/210 which is provided for transmitting user data or control messages to other entities via a transmission part of the transceiver. By way of example the transceiver is configured to transmit the service discovery response including the service identifiers. The transceiver is furthermore configured to receive user data and control messages from other entities with a receiving functionality of the transceiver. The transceiver is specially qualified to receive the service discovery requests and the further requests.

The entity 100 or 200 furthermore comprises a processing unit 120/220 which is responsible for the operation of the entity 100 or 200. The processing entity 120 and 220 comprises one or more processors and can carry out instructions stored on a memory 130 or 230, wherein the memory may include a read-only memory, a random access memory, a mass storage, a hard disk of the like. The memory can furthermore include a suitable program code to be executed by the processing unit 120 or 220 so as to implement the above described functionalities in which the registry is involved in the embodiments of FIGS. 2 and 3 and in which the message proxy is involved in the embodiments of FIGS. 4 and 5.

Figure 8:
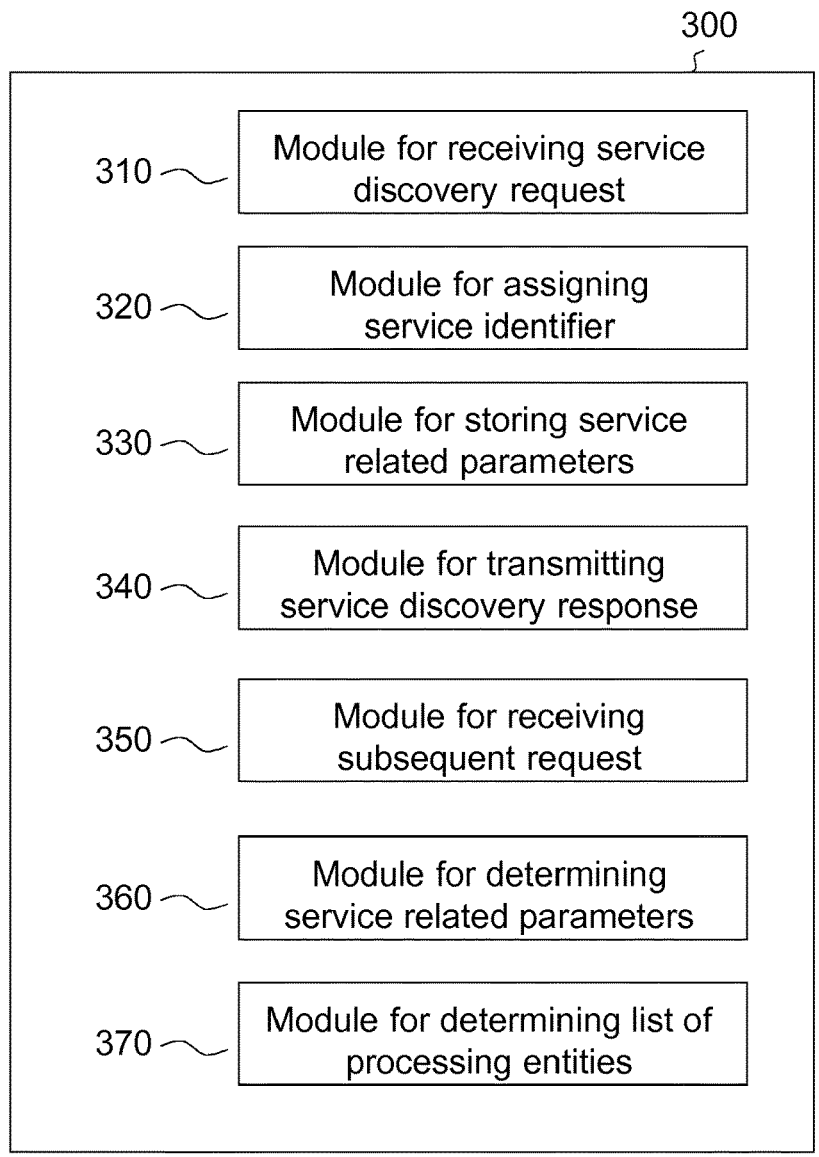
FIG. 8 shows another schematic representation of an entity handling the service discovery request.

FIG. 8 shows a further alternative embodiment of an entity corresponding to the registry 200 or the message proxy 100, here it is entity 300 comprising different modules configured to carry out the different functionalities described above. The entity comprises a module 310 which is configured to receive the service discovery request including the service related parameters. The module 300 comprises a module 320 for assigning the service identifier to the service discovery request and a module 330 for storing the service related parameters in connection with the service identifier. A module 340 is provided configured to transmit the service discovery response to the client in response to the received request wherein the service identifier is included into the service discovery response. A module 350 is provided which is configured to receive the subsequent request related to the service for which the service discovery request was received. A module 360 is provided to determine the service related parameters based on the service identifier contained in the subsequent request. The entity 300 then comprises a module 370 to determine a list of processing entities capable of carrying out the requested service or capable of handling the subsequent request related to the requested service based on the determined service related parameters.

In the embodiments discussed above a service discovery request was sent by the client either to the message proxy 100 or to the registry 200. The service discovery request can be a request by a service consumer or a client intended to discover service instances or processing entities/service that are available in the network based on various parameters. The parameter can include information about the service name, the network function type of the expected network function instance. Additionally, parameters may include the parameter SUPI (Subscription Permanent Identifier), dataset identifiers, NSI ID (Network Slice Instance Identifier) or the other service related parameters mentioned above. Accordingly, the service discovery request is a request in which the consumer of the service intends to discover services that are available in the network based on the service name and target network function type.

As far as a service request or the subsequent requests related to the service are concerned such a service request can be a request by a service consumer or a client which is intended to access the services provided by the service instance through an API (application programming interface). Accordingly, the steps S36 and S57 are service requests in which service consumer intends to access the services provided by the processing entities.

Figure 9:
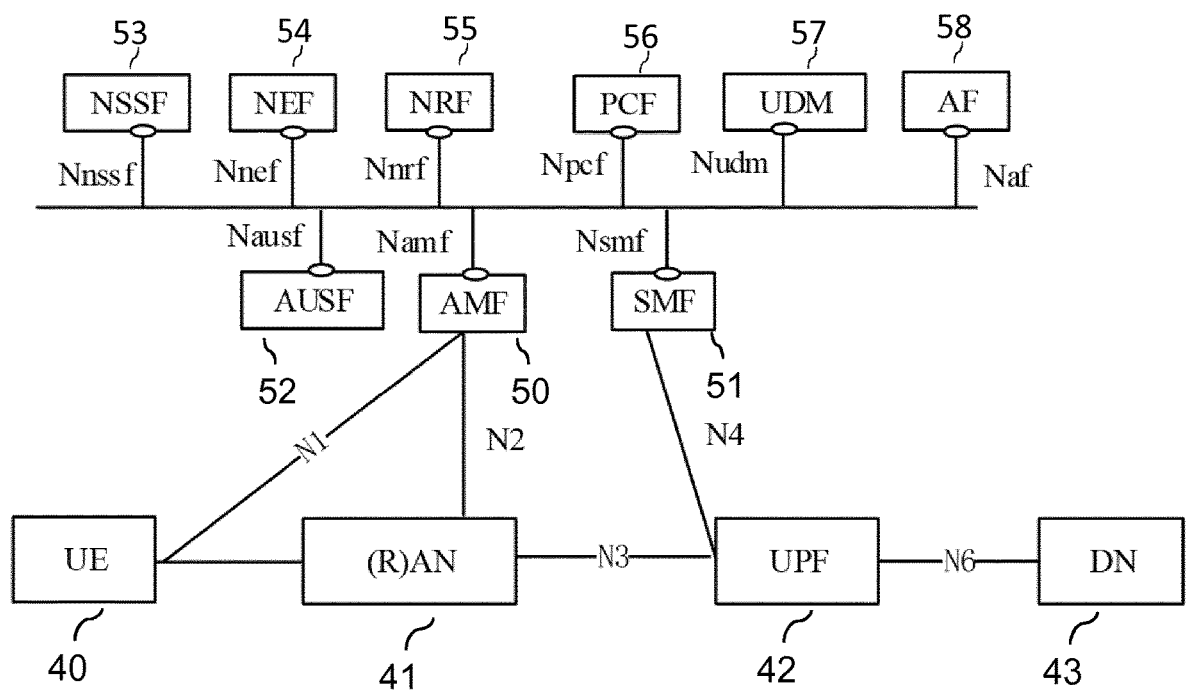
FIG. 9 shows a schematic overview over a network in which the entities shown in FIGS. 2 and 4 may be included.

FIG. 9 schematically illustrates a cellular network according to the 3GPP 5G architecture. Further details about the network can be found in 3TPP TS 23.501 version 2.0.1 of December 2017. A mobile entity or user entity, UE 40 which can be a cellular phone, an IOT (Internet of Things) device, an MTC (Machine Type Communication) device, a personal digital assistant type of device like a laptop, notebook or notepad or a tablet. As indicated the UE may be associated with non-humans like animals, plants or machines. The UE connects to the network via the radio access network (RAN) 41. The radio access network 41 is connected to a user plane function (UPF) 42 which is connected to a data network (DN) 43. The RAN 41 is connected to an access and mobility management function, AMF 50 which has inter alia the functionality of a mobility management and reachability management. The user plane function, UPF 42 which has the functionality inter alia of the anchor point or the point of connection to the data network 43 is furthermore connected to a session management function, SMF 51 which amongst others has the functionality of a session management such as modifying or releasing a session. All the different functions are interconnected to one another as shown by network 70. The further functions illustrated in FIG. 9 are the authentication server functions. A USF 52, the network sliced selection function (NSSF) 53, the network exposure function (NEF) 54, the network function repository function NRF 55, the policy control function (PCF) 56, the unified data management (UDM) 57 and application function (AF) 58.

The client 50 described in connection with FIGS. 2 to 5 requesting the service discovery can be any of the network functions 51 to 58 shown in FIG. 9, but preferably for services from the NRF 55, UDM 57, AUSF 52 and NSSF 53.

From the above said some general conclusions can be drawn:
the entity handling the service discovery request, thus either the proxy 100 or the registry 210 generates the list of processing entities and can start generating the list after receiving the service discovery request and even before receiving the subsequent request, wherein the generation of the list of processing entities is completed after the subsequent request is received. Referring to FIGS. 2 and 3 this means that for improving the latency of the service discovery response sent by the registry 200 in step S38 the generation of the list can already be started after receiving the request from the client in step S31. However, it is clear that it can be only completed after receiving the service identifier in step S36.

The entity that is handling the service discovery request or the subsequent request can be the entity operating as a database of available service instances which are available in the corresponding network, such as the registry 200 shown in FIG. 2.

In this embodiment the subsequent request is a service discovery request received from a message proxy 100 as discussed above in connection with step S36 and a subsequent response is transmitted to the message proxy 100 comprising the generated list of processing entities as discussed above in connection with step S38.

Furthermore, it is possible that the entity handling the service discovery request is a message proxy 100 provided in the network.

Here the proxy may carry out the additional steps of transmitting a second service discovery request to the registry 200 wherein this second service discovery request comprises the plurality of service related parameters as discussed above in connection with step S53. Furthermore, the proxy 100 receives a second service discovery response from the registry 200 wherein the determined list of processing entities is received in the second service discovery response such as response S54. The proxy then selects one of the processing entities from the list of processing entities based on the stored plurality of service related parameters as shown by step S58 and forwards a second service request to the selected processing entity as shown in step S59.

The service identifier is transmitted with the FQDN service discovery response and may be encoded into the response as a fully qualified domain name or as an address of the entity operating as a database of the available service instances.

Summarising, the above described application has the advantage that it ensures the deployment of a message proxy in a client based service selection architecture as known in the 5G core network. The message proxy can implement common functions that are currently implemented separately for each service. These common functions could be:

The service discovery that takes over the original discovery method by the client, but this method may also be extended to the discovery of connectivity options to the services and potential optional service features that are embedded in the client request and be selected based on a negotiation process otherwise, A further common function is access control which can be more granular at the proxy than at the service discovery Service discovery that takes over the original discovery method by the client, but may also be extended to the discovery of connectivity options to the services, and potential optional service features that are embedded in the client request and would be selected based on a negotiation process otherwise Access control, which can be more granular at a proxy than at service discovery (the latter referring to the whole client)

Load balancing among different instances of the same service, potentially interfacing with infrastructure features to learn about health and load information of different service instances Message reliability handling, including
  Message retransmissions
  Failure handling. i.e., retransmit to other instances after failure reliability handling Security, e.g., message authentication and encryption Performance improvements, via one or more of the following mechanisms:
  Message prioritization: during congestion, high priority messages are processed first
  Quotas, i.e., limit messaging per client, per server, etc.

Message aggregation, i.e., decreasing server load by aggregating multiple similar messages Message manipulation, e.g., handle multivendor incompatibility issues The proxy 100 provides flexibility on how to share functionality between the client 50 and proxy 100, i.e., the proxy can more flexibly adapt to the technology evolution as client modifications might require standardization.

Furthermore, it enables extensibility by including non-standard services, e.g., by supporting non-standard APIs and message manipulation by the MP.

Summarising, the application provides a method for conveying the service related parameters used in the service discovery request by the client to the receiver of the subsequent requests by the client to the service to be discovered by storing the service related parameters and assigning a unique ID, the service identifier to them. The ID is then encoded into the service discovery response so that it becomes part of the subsequent requests to the service that was previously searched for in the service discovery request.

The invention claimed is:

1. A method for handling a service discovery request for a service provided by a service based architecture communications network comprising a message proxy, the method comprising at an entity handling the service discovery request:

receiving the service discovery request from a client requesting a service in the service based architecture communications network in which the service is provided by a plurality of different processing entities, the received service discovery request comprising a plurality of service related parameters;

assigning a service identifier to and uniquely identifying, the service discovery request, the identifier linking the received service discovery request to the plurality of service related parameters;

storing the plurality of service related parameters with the service identifier at the entity handling the service discovery request;

transmitting a service discovery response to the client in response to the received service discovery request, the service discovery response comprising the service identifier;

receiving a subsequent request related to the service, the subsequent request comprising the service identifier;

determining the plurality of service related parameters for the subsequent request based on the received service identifier present in the subsequent request and the stored plurality of service related parameters; and determining a list of processing entities capable of handling the subsequent request related to the service based on the determined plurality of service related parameters.

2. The method according to claim 1, wherein generating the list of processing entities is started after receiving the service discovery request and before receiving the subsequent request, wherein generating the list of processing entities is completed after the subsequent request is received.

3. The method according to claim 2, wherein the entity handling the service discovery request is an entity operating as database of available service instances which are available in the service based architecture communications network.

4. The method according to claim 3, wherein the subsequent request is a service discovery request received from a message proxy, wherein a subsequent response is transmitted to the message proxy comprising the generated list of processing entities.

5. The method according to claim 2, wherein the entity handling the service discovery request is a message proxy provided in the service based architecture communications network.

6. The method according to claim 5, further comprising:

transmitting a second service discovery request to an entity operating as database of available service instances which are available in the service based architecture communications network, the second service discovery request comprising the plurality of service related parameters receiving a second service discovery response from the entity operating as database of available service instances, wherein the determined list of processing entities is received in the second service discovery response;

selecting one of the processing entities from the list of processing entities based on the stored plurality of service related parameters; and forwarding a second service request to the selected processing entity.

7. The method according to claim 2, wherein the service identifier transmitted with the service discovery response is encoded into the service discovery response in at least one of a Fully Qualified Domain Name, FQDN, and an address of the entity operating as database of available service instances.

8. The method according to claim 1, wherein the entity handling the service discovery request is an entity operating as database of available service instances which are available in the service based architecture communications network.

9. The method according to claim 8, wherein the subsequent request is a service discovery request received from a message proxy, wherein a subsequent response is transmitted to the message proxy comprising the generated list of processing entities.

10. The method according to claim 1, wherein the entity handling the service discovery request is a message proxy provided in the service based architecture communications network.

11. The method according to claim 10, further comprising:

transmitting a second service discovery request to an entity operating as database of available service instances which are available in the service based architecture communications network, the second service discovery request comprising the plurality of service related parameters;

receiving a second service discovery response from the entity operating as database of available service instances, wherein the determined list of processing entities is received in the second service discovery response;

selecting one of the processing entities from the list of processing entities based on the stored plurality of service related parameters; and forwarding a second service request to the selected processing entity.

12. The method according to claim 1, wherein the service identifier transmitted with the service discovery response is encoded into the service discovery response in at least one of a Fully Qualified Domain Name, FQDN, and an address of the entity operating as database of available service instances.

13. An entity handling a service discovery request for a service provided by a service based architecture communications network comprising a message proxy, the entity comprising a memory and at least one processing unit, the memory comprising instructions executable by the at least one processing unit, the entity being configured to:
- receive the service discovery request from a client requesting a service in the service based architecture communications network in which the service is provided by a plurality of different processing entities, the received service discovery request comprising a plurality of service related parameters;
- assign a service identifier to, and uniquely identifying, the service discovery request, the identifier linking the received service discovery request to the plurality of service related parameters;
- store the plurality of service related parameters with the service identifier at the entity handling the service discovery process;
- transmit a service discovery response to the client in response to the received request, the service discovery response comprising the service identifier;
- receive a subsequent request related to the service, the subsequent request comprising the service identifier;
- determine the plurality of service related parameters for the subsequent request based on the received service identifier present in the subsequent request; and
- determine a list of processing entities capable of handling the subsequent request related to the service based on the determined service related parameters.

14. The entity handling the service discovery request according to claim 13, being further configured to start generating the list of processing entities after receiving the service discovery request and before receiving the subsequent request, and to complete generating the list of processing entities after the subsequent request is received.

15. The entity handling the service discovery request according to claim 14, wherein the entity is operating as an entity operating as database of available service instances which are available in the service based architecture communications network.

16. The entity handling the service discovery request according to claim 13, wherein the entity is operating as an entity operating as database of available service instances which are available in the service based architecture communications network.

17. The entity handling the service discovery request according to claim 16, wherein the subsequent request is a service discovery request received from a message proxy, the entity being configured to transmit a subsequent response to the message proxy comprising the generated list of processing entities.

18. The entity handling the service discovery request according to claim 13, wherein the entity is operating as a message proxy provided in the service based architecture communications network.

19. The entity handling the service discovery request according to claim 18, being further configured to:
- transmit a second service discovery request to an entity operating as database of available service instances which are available in the service based architecture communications network, the second service discovery request comprising the plurality of service related parameters;
- receive a second service discovery response from the entity operating as database of available service instances, wherein the determined list of processing entities is received in the second service discovery response;
- select one of the processing entities from the list of processing entities based on the stored plurality of service related parameters; and
- forward a second service request to the selected processing entity.

20. The entity handling the service discovery request according to claim 13, being further configured to encode the service identifier transmitted with the service discovery response into the service discovery response in at least one of a Fully Qualified Domain Name, FQDN, and an address of the entity operating as database of available service instances.

* * * * *